United States Patent [19]

Hanya

[11] Patent Number: 5,628,843

[45] Date of Patent: May 13, 1997

[54] PNEUMATIC TIRE WITH GROOVE HAVING THREE DIFFERENT CROSS-SECTIONAL SHAPES

[75] Inventor: Masahiro Hanya, Kobe, Japan

[73] Assignee: Sumitomo Rubber Industries, Ltd., Hyogo-ken, Japan

[21] Appl. No.: 341,225

[22] Filed: Dec. 2, 1994

[30] Foreign Application Priority Data

Dec. 29, 1993 [JP] Japan ................................. 5-350691

[51] Int. Cl.$^6$ ............................................. B60C 113/00
[52] U.S. Cl. ........................................... 152/209 R
[58] Field of Search ........................... 152/209 R, 209 D

[56] References Cited

U.S. PATENT DOCUMENTS

| | | | |
|---|---|---|---|
| 3,664,402 | 5/1972 | Montagne | 152/209 R |
| 3,674,076 | 7/1972 | Dailey | 152/209 R |
| 4,697,627 | 10/1987 | Mitsutake | |
| 4,796,683 | 1/1989 | Kawabata et al. | 152/209 R |
| 5,178,698 | 1/1993 | Shibata | 152/209 R |
| 5,450,885 | 9/1995 | Hanya | 152/209 R |

FOREIGN PATENT DOCUMENTS

| | | |
|---|---|---|
| 0495619 | 7/1992 | European Pat. Off. . |
| 0520755 | 12/1992 | European Pat. Off. . |
| 0547019 | 6/1993 | European Pat. Off. . |
| 3824897 | 1/1990 | Germany . |
| 153304 | 6/1989 | Japan . |
| 171306 | 7/1990 | Japan . |
| 70605 | 3/1991 | Japan . |
| 246104 | 11/1991 | Japan .................................. 152/209 R |
| 19203 | 1/1992 | Japan . |
| 146804 | 5/1992 | Japan . |
| 176711 | 6/1992 | Japan . |
| 122303 | 5/1994 | Japan . |

Primary Examiner—Steven D. Maki
Attorney, Agent, or Firm—Birch, Stewart, Kolasch & Birch, LLP

[57] ABSTRACT

A pneumatic tire is provided which has an improved tread portion capable of preventing a wandering phenomenon caused by the rain-grooves of the roads and reducing the running noise of the tire. The circumferentially extending main groove is made up of parts having at least three pitch lengths wherein the short pitch length has a first cross-sectional shape and the long pitch length has a second cross sectional shape or a third cross section shape and the groove width at the tread face in the second and third cross sectional shapes is in the range of from 1.05 to 2.5 times that in the first-cross sectional shape.

7 Claims, 4 Drawing Sheets

PNEUMATIC TIRE WITH GROOVE HAVING THREE DIFFERENT CROSS-SECTIONAL SHAPES

BACKGROUND OF THE INVENTION

The present invention relates to a pneumatic tire having an improved tread portion which is capable of preventing the wandering phenomenon of a vehicle when running on a road provided with rain grooves. The present invention is also directed to a tire tread which is capable of reducing the running noise of the tire.

In recent years, as the expressway network is developed and vehicle performance is remarkably improved, to obtain a superior drainage performance during high speed running, tires having wide main grooves extending substantially straight in the circumferential direction of the tire are widely used, for example, in passenger cars.

In some regions in some countries, to improve drainage and thereby to prevent accidental slip under wet conditions, so called rain groove are provided on the roads surface. The rain grooves are parallel narrow grooves extending in the longitudinal direction of the road and their pitch in the transverse direction of the road are about 15 to 30 mm.

Therefore, when tires having the above-mentioned pattern run on such a road, the edges of the tire grooves and the edges of the rain grooves often engaged with each other, and the rain groves interfere with the lateral movement of the tire. This is felt by the driver as a wandering phenomenon of the vehicle. If the pitch of the main grooves of a tire coincides with the pitch of the rain grooves, there is the possibility that the tire grooves and the rain grooves will tightly engaged each other during running, which can be very dangerous.

In a tread pattern including straight wide main grooves, a so called air resonance noise is generated when running on well-paved roads at high speed. The air existing in the tubes formed between the road surface and main grooves in the ground contacting patch is excited by vibrations of the tread elements and pulsative air flow, and the air resonates at a certain frequency (about 800 to 1250 Hz) to generate an air resonance noise. If the depth of the main grooves is decreased, the resonance noise can be reduced, but the wet performance of the tire is greatly decreased.

An object of the present invention is therefore to provide a pneumatic tire in which the wandering phenomenon caused by rain grooves is effectively prevented.

Another object of the present invention is to provide a pneumatic tire in which the running noise due to air resonance in the main grooves is effectively reduced without sacrificing the wet performance of the tire.

SUMMARY OF THE INVENTION

According to one aspect of the present invention, a pneumatic tire comprises a main groove extending in the circumferential direction of the tire and lateral grooves extending in the axial direction of the tire, the lateral grooves intersecting the main groove to divide the main groove into a plurality of main groove parts, each defined by the circumferentially adjacent intersections of the lateral grooves with the main groove, the main groove parts having at least three different circumferential pitch lengths: a short pitch length, a middle pitch length and a long pitch length, the short pitch length having a first cross sectional shape, the long pitch length having a second cross-sectional shape or a third cross sectional shape which is different from the first cross sectional shape.

In a meridian section including the tire axis, the first cross sectional shape comprises a pair of opposite groove sidewalls, each of which extends straight from the tread surface to the groove bottom at a certain inclination angle so that the groove width increases towards the radially outside of the tire.

The second cross sectional shape comprises a pair of opposite groove sidewalls, one of which extends straight from the tread surface to the groove bottom at a certain inclination angle, and the other is convexly curved and extends from the tread surface towards the groove bottom, so that the groove width increases towards the radially outside of the tire.

The third cross sectional shape comprises a pair of opposite groove sidewalls, each of which is convexly curved and extends from the tread surface towards the groove bottom, so that the groove width increases towards the radially outside of the tire.

The groove width at the tread face in the second and third cross sectional shapes is in the range of from 1.05 to 2.5 times that in the first cross-sectional shape.

Accordingly, as the above-mentioned second and third cross sectional shapes include a convexly curved sidewall, the edges of those groove parts are not sharp. Further, as the first shape is different from the second and third shapes with respect to the groove width at the tread face, the edges of the main groove change in axial positions as the tire rotates. Furthermore, the cross-sectional shape is also changed.

Therefore, the groove parts having the second or third shape become superior in running across the rain groove edges. As a result, the wondering phenomenon can be prevented. Further, the possible dangerous tight engagement between the main grooves and the rain grooves during running is avoided. Accordingly, as the resonance mode of the above-mentioned tube is altered as the tire rotates, the occurence of the air resonance is decreased which reduces tire running noise.

BRIEF DESCRIPTION OF THE DRAWINGS

An embodiment of the present invention will now be described in detail in conjunction with the accompanying drawings, wherein.

DETAILED DESCRIPTION OF THE INVENTION

Figure 1:
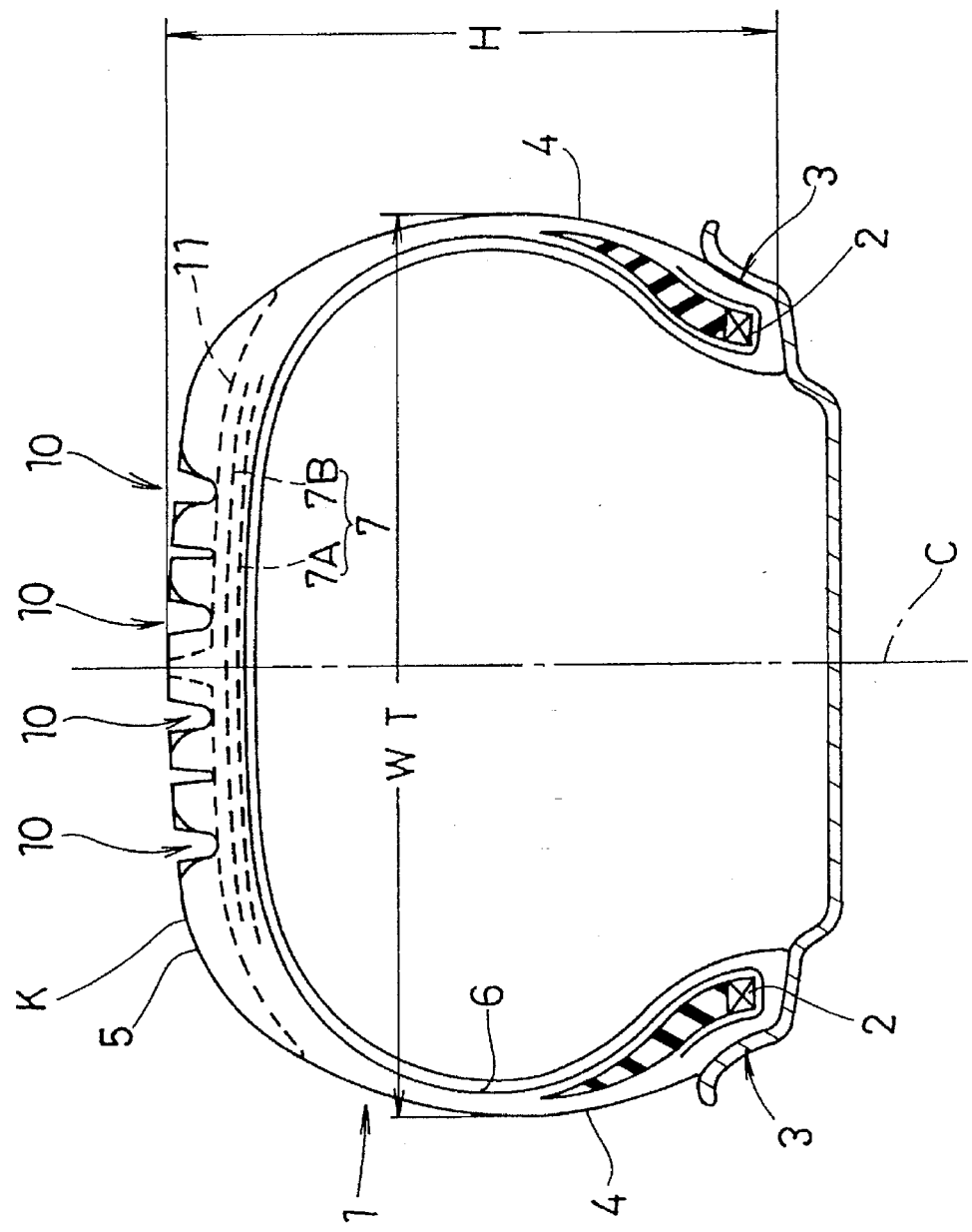
FIG. 1 is a cross sectional view of an embodiment of the present invention.

In the figures, the pneumatic tire 1 according to the present invention is a passenger car tire having a low aspect ratio (tire section height H/tire maximum width WT) of not more than 80%.

The tire 1 has a tread portion 5, a pair of axially spaced bead portions 3, and a pair of sidewall portions 4 extending between the tread edges and the bead portions. Further, the tire 1 comprises a pair of bead cores 2 disposed in each of the bead portions 3, a carcass 6 extending between the bead portions through the tread portion 5 and sidewall portions 4 and turned up around the bead core 2 from the inside to the outside of the tire, and a stiff belt 7 disposed radially outside the carcass 6 and inside the tread portion 5.

The carcass 6 comprises at least one ply of cords arranged radially at an angle of from 60 to 90 degrees with respect to the tire equator C to have a radial or semi-radial structure.

For the carcass cords, organic fiber cords, e.g. polyester, nylon, rayon and the like and steel cords can be used.

The belt 7 comprises at least one ply, in this embodiment two plies 7A and 7B, of cords laid at an angle of from not more than 30 degrees with respect to the tire equator C.

The cords in the radially inner ply 7A cross the cords in the radially outer ply 7B.

For the belt cords, metal cords such as steel and organic fiber cords, e.g. nylon, polyester, rayon and the like can be used.

The above-mentioned tread portion 5 is provided with tread grooves defining a block pattern or block/rib pattern. The tread grooves include main grooves 10 extending in the circumferential direction of the tire and lateral grooves 11 extending in the tire width direction and intersecting the main grooves 10. Here, a rib is a circumferentially continuous tread element, and therefore, a block-rib pattern consists of at least one circumferentially continuous element and a plurality of circumferentially discontinuous elements, and a block pattern consists of only a plurality of circumferentially discontinuous elements.

Figure 2:
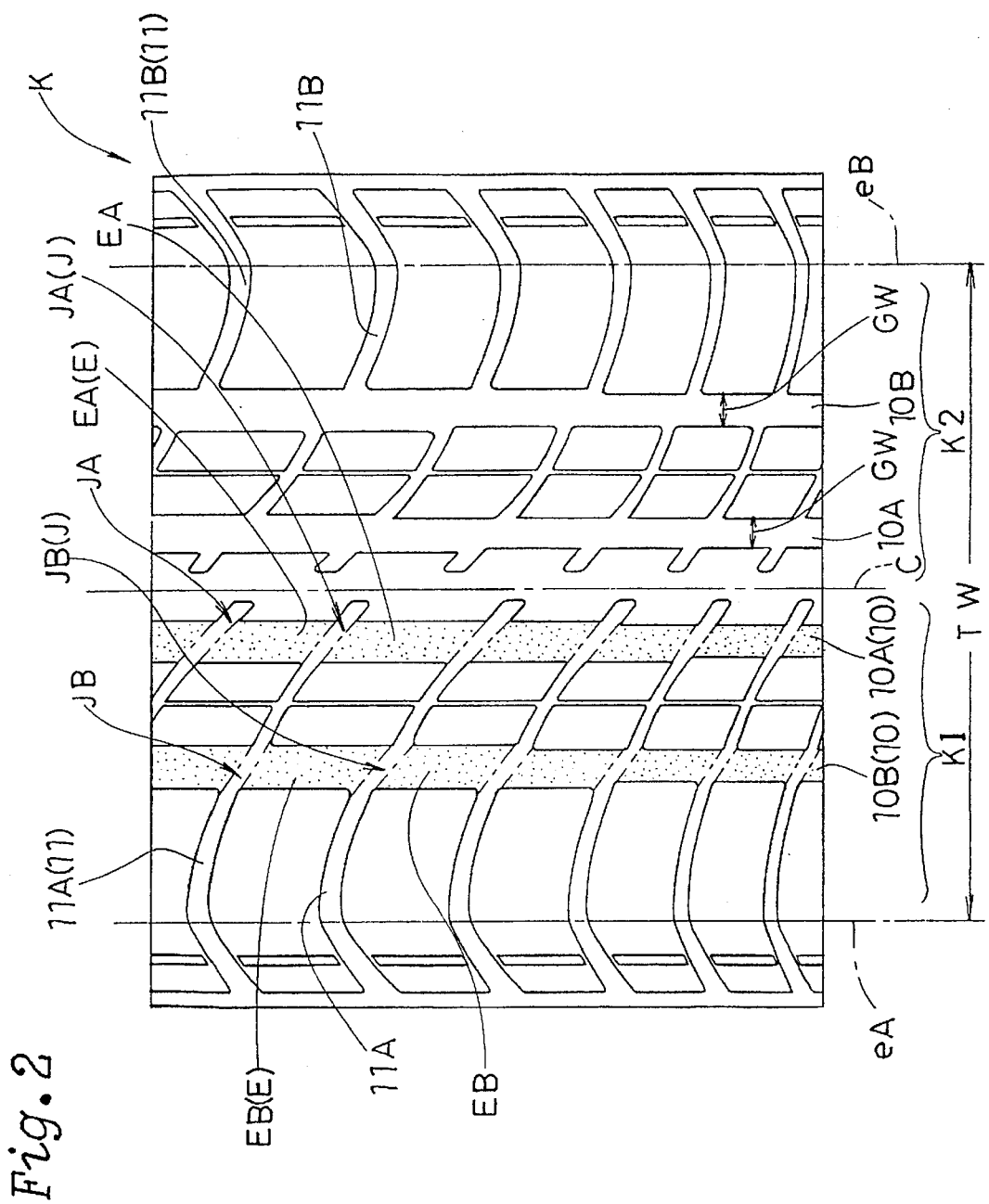
FIG. 2 is a plan view showing the tread pattern thereof.

As shown in FIG. 2, in this embodiment, the main grooves 10 are straight in the circumferential direction of the tire. The main grooves 10 include a pair of axially inner main grooves 10A and 10A each disposed on each side of the tire equator C, and a pair of axially outer main grooves 10B and 10B each disposed axially outside of each of the inner main grooves 10A. Each of the main grooves 10A and 10B has, at the tread face K, a width GW of not less than 3% of the tread width TW and not less than 5 mm, and the groove depth D is substantially constant along its entire length.

The lateral grooves 11 in this embodiment include lateral grooves 11A extending axially Inwardly from one of the tread edges eA and terminating near the tire equator C, and lateral grooves 11b extending axially inwardly from the other tread edge 11B and terminating near the tire equator C. The lateral grooves 11A are disposed within a half K1 of the tread face K, for example on the left side of the tire equator C, and the lateral grooves 11B are disposed within a right half K2 of the tread face K. Therefore, the axially inner ends of all the lateral grooves 11A and 11B are positioned before the tire equator C. However, it may be possible that the axially inner ends extend over the tire equator C, while being positioned near the tire equator C.

By the provision of the tread grooves, the tread face K is provided with a tread pattern such that the right half K2 is same as the left half K1 or alternatively the right half K2 is different from the left half K1. Here, the "different" means asymmetrical patterns in which the circumferential pitches of the lateral grooves, the sequence of the pitches and/or the configurations of the lateral grooves are differed. Accordingly, the "same" means patterns other than the above-explained asymmetrical patterns, including a so called symmetrical pattern.

In this embodiment, as shown in FIG. 2, In the ground contacting width TW, all the lateral grooves are inclined to the same direction, and as a result, the tread portion is provided with a symmetrical tread pattern in which the phase of the right half K2 is circumferentially shifted from that of the left half K1. (This type of pattern is called a "symmetrical" pattern.)

Figure 3:
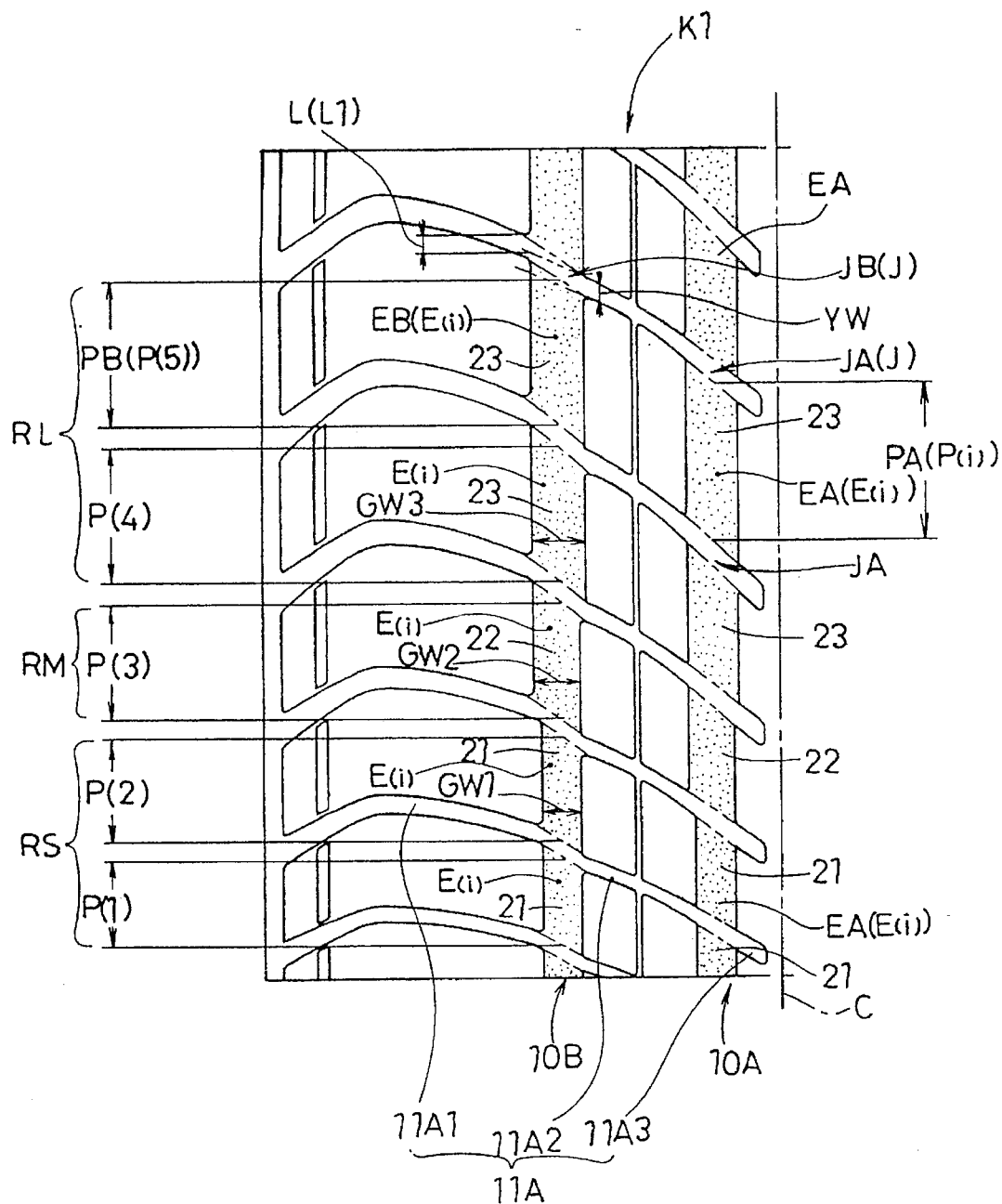
FIG. 3 is a plan view showing part of the tread pattern.

Therefore, using one half (left tread half K1) for convenience sake, the tread pattern will now be explained in conjunction with FIG. 3.

The lateral grooves 11A extend across the inner main groove 10A, defining a plurality of groove parts EA between the intersections JA and JA of the lateral grooves 11A with the inner main groove 10A.

Also, the lateral grooves 11A extend across the outer main groove 10B, defining a plurality of groove parts EB between the intersections JB and JB of the lateral grooves 11A with the outer main groove 10B.

The lengths of the groove parts EA which correspond to the circumferential pitches PA between the intersections JA and JA include a plurality of different lengths, and also the lengths of the groove parts EB which correspond to the circumferential pitches PB between the intersections JB and JB include a plurality of different lengths.

The lateral grooves 11A extend continuously and substantially parallel with each other, whereby in this embodiment the above-mentioned pitches PA are same as the pitches PB in respect to the number (n) of the different lengths and the sequence of the pitch arrangement.

Hereinafter, the pitches PA and PB, the intersections JA and JB, and the groove parts EA and EB are called generically pitches P, intersections J, and groove parts E, respectively.

Further, the following definitions are made: the number of the different pitches is (n); the different pitches are $P(i)$ ($i=1$ to n); $P(j) < P(J+1)$ ($j=1$ to $n-1$), i.e., $P(1) < P(2) < \ldots < P(n)$; and in ascending order, the pitch $P(i)$ of which order (i) is in the range of from $n/2$ to $(n+2)/2$ belongs to middle pitch group RM, the pitch of a lower order belongs to short pitch group RS, and the pitch of a higher order belongs to long pitch group RL.

In this embodiment, the number (n) of the different pitches $P(i)$ ($i=1$ to 5) is five.

$$P(1) < P(2) < P(3) < P(4) < P(5)$$

In this case, the middle pitch group RM consists of only the third pitch $P(3)$. The short pitch group RS consists of pitches $P(1)$ and $P(2)$. The long pitch group RL consists of pitches $P(4)$ and $P(5)$.

For example, when n=6, the middle pitch group RM consists of pitches $P(3)$ and $P(4)$. When n=7, RM consists of $P(4)$. When n=4, RM consists of $P(2)$ and $P(3)$. When n=3, RM consists of $P(2)$.

The cross sectional shapes of all the groove parts $E(i)$ corresponding to the pitches $P(i)$ belonging to the short pitch group RS are defined by a first shape 21.

The cross sectional shapes of all the groove parts $E(i)$ corresponding to the pitches $P(i)$ belonging to the long pitch group RL are defined by a second shape 22 and/or a third shape 23.

The cross sectional shapes of all the groove parts $E(i)$ corresponding to the pitches $P(i)$ belonging to the middle pitch group RM are defined by the first shape 21, second shape 22 and/or third shape 23.

Preferably, in the long pitch group RL, only the third shape 23 is used. And in the middle pitch group RM, only the second shape 22 is used.

Figure 4:
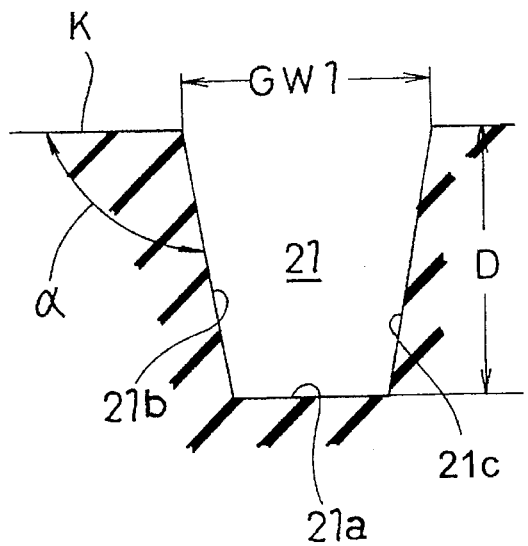
FIGS. 4, 5 and 6 are cross sectional views of the main groove.

In a meridian section including the tire axis, as shown in FIG. 4, the first shape 21 consists of a groove bottom 21a and a pair of groove sidewalls 21b and 21c, and each groove sidewall 21b, 21c extends straight from each edge of the groove bottom 21a to the tread face, increasing the width therebetween. The groove bottom 21a in this embodiment is a flat plane substantially parallel with the tread face K. The angle (alpha) between each of the groove sidewalls 21b and 21c and the tread face K is in the range of from 95 to 105 degrees.

Figure 5:
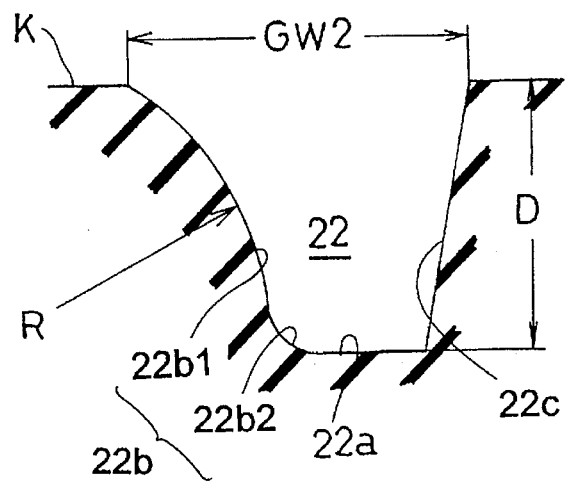

As shown in FIG. 5, the second shape 22 consists of a groove bottom 22a, and a pair of groove sidewalls 22b and 22c. The groove bottom 22a is a flat plane substantially parallel with the tread face K. The groove sidewall 22c extends straight from one edge of the groove bottom 22a to the tread face, inclining in the same manner as the above-mentioned first shape 21. The groove sidewall 22b consists of a convexly curved main portion 22b1 and a concavely curved lower portion 22b2. The main portion 22b1 extends from the tread face K to near the groove bottom 22a. The lower portion 22b2 extends from the radially inner end of the main portion 22b1 to the other edge of the groove bottom 22a.

Figure 6:
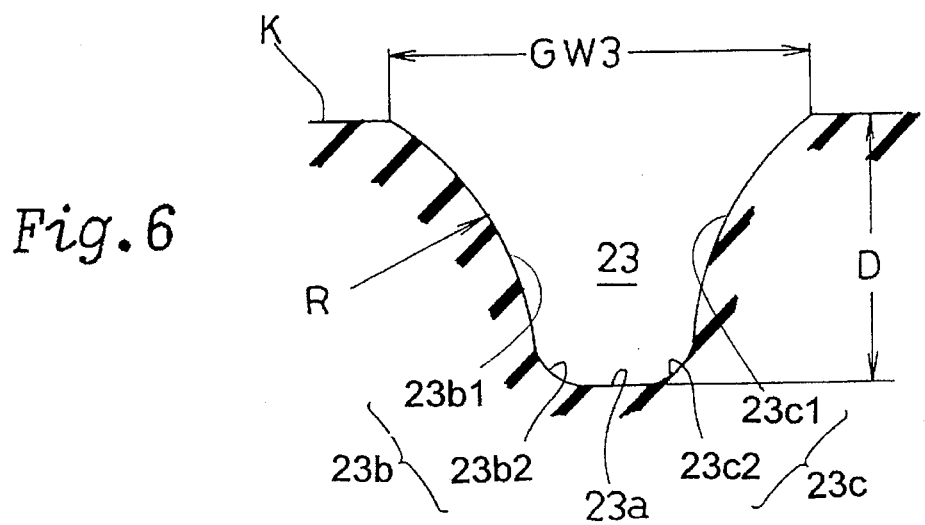

As shown in FIG. 6, the third shape 23 consists of a groove bottom 23a, and a pair of groove sidewalls 23b and 23c. The groove bottom 23a is a flat plane substantially parallel with the tread face K. Each of the groove sidewalls 23b and 23c consists of a convexly curved main portion 23b1 and 23c1 and a concavely curved lower portion 23b2 and 23c2. The main portion 23b1, 23c1 extends from the tread face K to near the groove bottom 23a. The lower portion 23b2, 23c2 extends from the radially inner end of the main portion 23b1, 23c1 to the other edge of the groove bottom 23a.

Further, at the tread face K, the groove widths GW2 and GW3 of the second and third shapes 22 and 23 are in the range of from 1.05 to 2.5 times the groove width GW1 of the first shape 21. In a main groove, the following relationship: GW1<GW2<GW3 is satisfied. The radius of curvature R of each of the above-mentioned groove sidewall 22b1, 23b1 and 23c1 is preferably in the range of from 0.5 to 1.5 times the groove depth D. If the radius of curvature R is less than 0.5 D, the ground contacting area is decreased to decrease the wet grip performance and wear durability. If the radius of curvature R is more than 1.5 D, the prevention of wandering performance becomes insufficient, and the noise reducing effect is decreased.

Preferably, the above-mentioned convexly curved sidewall main portions 22b1, 23b1 and 23c1 intersect the tread face K, with forming an obtuse angle at the intersection. However, it may be possible to connect the sidewall to the tread face smoothly without forming any angle.

The convexly curved main portions 22b1, 23b1 and 23c1 are connected to the concavely curved lower portions 22b2, 23b2 and 23c2 smoothly without forming any angle.

Further, the groove bottoms 21a, 22a and 23a may be curved.

In this embodiment, the first shape 21 and third shape 23 are substantially geometrically symmetric about the groove center line. However, the first shape 21 and/or third shape 23 can be asymmetric.

In a lateral groove 11A, a groove segment 11A1 between the main grooves 10B and the tread edge eA, a groove segment 11A2 between the main grooves 10B and 10A, and a groove segment 11A3 axially inside of the main grooves 10A are usually aligned, However, they can be circumferentially shifted if the shift L is less than 2 times the width YW of the lateral grooves 11A. In FIG. 3, between the segments 11A1 and 11A2, a shift L1 substantially equal to the width YW exists.

As described above, in the present Invention, the pneumatic tire has main grooves, each made up of parts having different widths and different sectional shapes. Therefore, the wandering phenomenon due to the rain grooves on the road surface can be prevented, and the tire running noise due to the air resonance in the main groove can be reduced.

I claim:

1. A pneumatic tire comprising a tread face, at least one main groove extending in the circumferential direction of the tire and lateral grooves extending in the axial direction of the tire, the lateral grooves intersecting the main groove to divide the main groove into a plurality of main groove parts, each of the main groove parts being defined between the circumferentially adjacent intersections of the lateral grooves with the main groove, the main groove parts having at least three different circumferential pitch lengths: a short pitch length, a middle pitch length, and a long pitch length, the main groove parts having the short pitch length being provided with a first cross-sectional shape, the main groove parts having the middle pitch length being provided with a second cross-sectional shape, the main groove parts having the long pitch length being provided with a third cross-sectional shape, the first cross-sectional shape comprising, in a meridian section including the tire axis, a pair of opposite groove sidewalls, each of which extends straight from the tread face to the groove bottom at a predetermined inclination angle so that the groove width increases towards the radial outside of the tire, the second cross-sectional shape comprising, in a meridian section including the tire axis, a pair of opposite groove sidewalls, one of which extends straight from the tread face to the groove bottom at a predetermined inclination angle, and the other consists of a main portion which is convexly curved and extends from the tread face towards the groove bottom and a lower portion which extends from the radially inner end of the main portion to one of the edges of the groove bottom, so that the groove width increases towards the radial outside of the tire, the third cross-sectional shape comprising, in a meridian section including the tire axis, a pair of opposite groove sidewalls, each of which consists of a main portion which is convexly curved and extends from the tread face towards the groove bottom and a lower portion which extends from the radially inner end of the main portion to one of the edges of the groove bottom, so that the groove width increases towards the radial outside of the tire, and the groove width at the tread face in the second and third cross-sectional shapes is in the range of from 1.05 to 2.5 times that in the first cross-sectional shape wherein each of convexly curved main portions intersect the tread face so as to define an edge and form an obtuse angle at the intersection.

2. The pneumatic tire according to claim 1, wherein the radius of curvature of the convexly curved main portions of the groove sidewalls of the second and third cross-sectional shapes is in the range of from 0.5 to 1.5 times the groove depth.

3. The pneumatic tire according to claim 1, wherein the angle between the inclined straight sidewalls and the tread face at the intersection is in the range of from 95 to 105 degrees.

4. The pneumatic tire according to claim 1, wherein the groove widths GW1, GW2 and GW3 of the first, second and third shapes, respectively in each main groove satisfy a relationship: GW1<GW2<GW3.

5. The pneumatic tire according to claim 1, wherein the first cross-sectional shape is substantially geometrically symmetric about the groove center line, and the third cross-sectional shape is substantially geometrically symmetric about the groove center line.

6. The pneumatic tire according to claim 1, wherein the first and third cross-sectional shapes are substantially geometrically symmetric about the groove center line, the convexly curved main portion of each of the groove sidewalls of the second and third cross-sectional shapes has a single radius of curvature of from 0.5 to 1.5 times the groove depth, and the inclined straight sidewalls of the first and second cross-sectional shapes intersect the tread face at an angle of from 95 to 105 degrees.

7. The pneumatic tire according to claim 6, wherein the groove widths GW1, GW2 and GW3 of the first, second and third shapes, respectively, in each main groove satisfy a relationship: GW1<GW2<GW3.

* * * * *